Nov. 3, 1970   E. B. G. NIJHOF ET AL   3,538,417
BRIDGE TYPE FREQUENCY CONVERTER
Filed March 5, 1968

INVENTORS
ENGBERT B. G. NIJHOF
WILHELMUS B. ROSINK

BY Frank R. ~~~~
AGENT

Nov. 3, 1970  E. B. G. NIJHOF ET AL  3,538,417
BRIDGE TYPE FREQUENCY CONVERTER
Filed March 5, 1968  3 Sheets-Sheet 3

INVENTORS
ENGBERT B.G. NIJHOF
WILHELMUS B. ROSINK

BY
AGENT

United States Patent Office 3,538,417
Patented Nov. 3, 1970

3,538,417
BRIDGE TYPE FREQUENCY CONVERTER
Engbert Bernard Gerard Nijhof, and Wilhelmus Bernardus Rosink, Emmasingel, Eindhoven, Netherlands, assignors, by mesne assignments, to U.S. Philips Corporation, New York, N.Y., a corporation of Delaware
Filed Mar. 5, 1968, Ser. No. 710,548
Claims priority, application Netherlands, Mar. 22, 1967, 6704215
Int. Cl. H02m 7/00, 5/30
U.S. Cl. 321—6                10 Claims

ABSTRACT OF THE DISCLOSURE

A frequency converter comprising a plurality of controlled rectifiers connected to form a bridge circuit including at least 2 DC circuits each comprising 2 rectifiers serially connected with the same polarity. The bridge output terminals are connected to one end of an output circuit via first and second coils. The other end of the output circuit is connected to a neutral point of the AC supply voltage for the bridge circuit. The output circuit and each coil form a series circuit tuned to a frequency that is higher than the desired output frequency, which in turn is higher than the AC supply frequency. The bridge rectifiers are triggered to alternately control all the rectifiers connected to one coil and then all the rectifiers connected to the other coil.

Figure 1:
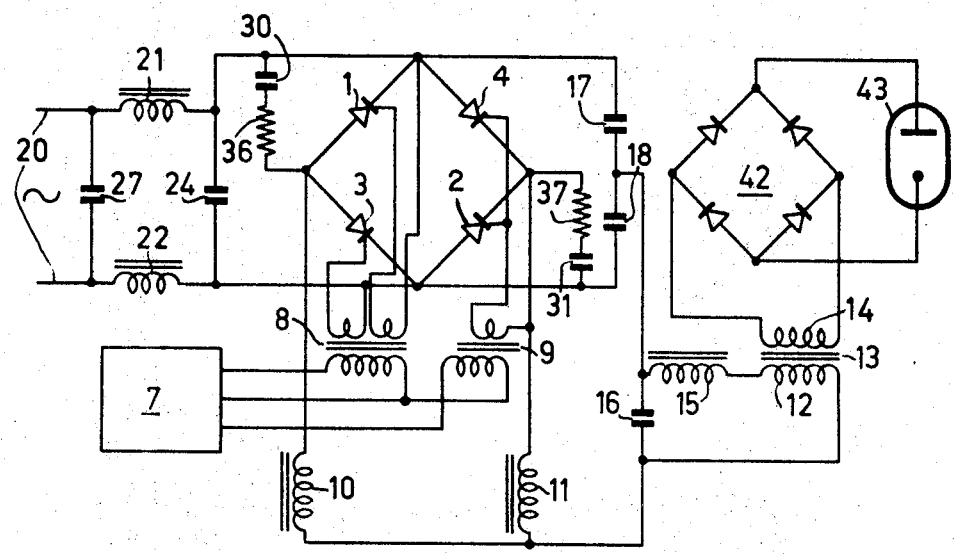

This invention relates to a frequency converter comprising a plurality of controlled rectifiers and a generator for controlling said rectifiers in accordance with a desired output frequency.

Such frequency converters are known, for example, from the SCR Manual of General Electric, third ed., pages 184–186, in which they are called "cycloconverters." Said known converters are used to transform an AC supply voltage into an output voltage of lower frequency. If, however, an AC supply voltage is to be transformed into an output voltage of higher frequency, use is made of a rectifier which transforms the AC supply voltage into a pulsating or non-pulsating DC voltage and a converter which in turn converts said DC voltage into an output AC voltage of higher frequency.

An object of the invention is to provide an improved and greatly simplified frequency-increasing converter that eliminates the intermediate DC stage, thus economizing on rectifiers and/or heavy, bulky and expensive AF transformers. It is based on recognition of the fact that it is possible, with the aid of various steps of the switching technique and proportioning steps, to operate a combination of at least two known DC–AC voltage single-ended push-pull converters as a frequency-increasing converter. For example, the supply power for an apparatus to be operated at a high voltage, such as a magnetron high-frequency generator, can be converted into a frequency higher than that of an AC voltage supply, after which said power can be transformed into the desired high voltage with the aid of a small, light, and cheap RF transformer and then rectified.

The frequency converter according to the invention is characterized in that it comprises a rectifier bridge having at least two DC circuits each consisting of two controlled rectifiers connected in series and in the same pass direction. The DC voltage output points of said bridge are connected through respective choke coils to one end of an output circuit, the other end of which is connected to a neutral point of the AC voltage supply source. The common point of the two controlled rectifiers of each DC circuit is connected to a corresponding terminal of the AC voltage supply source. The output circuit together with each of the two choke coils, forms a series circuit tuned to a frequency higher than the desired output frequency, which in turn is higher than that of the AC supply voltage. A generator alternately controls all of the controlled rectifiers connected to one of the choke coils and all of the controlled rectifiers connected to the other choke coil.

The output circuit, together with each of the two choke coils preferably forms a series circuit tuned to a frequency higher than 1.4 times the maximum output frequency. Under these circumstances the size and the character of the load has very little influence on the operation of the converter as long as the loading power does not exceed the maximum power of the converter. The converter is therefore eminently suitable for supplying widely varying loads, for example, loads having a reverse voltage source character such as the anode circuit of a magetron, one or more gas or vapour-filled discharge lamps, a motor, an accumulator battery, or a rectifier including a filter with an input capacitor.

Figure 2:
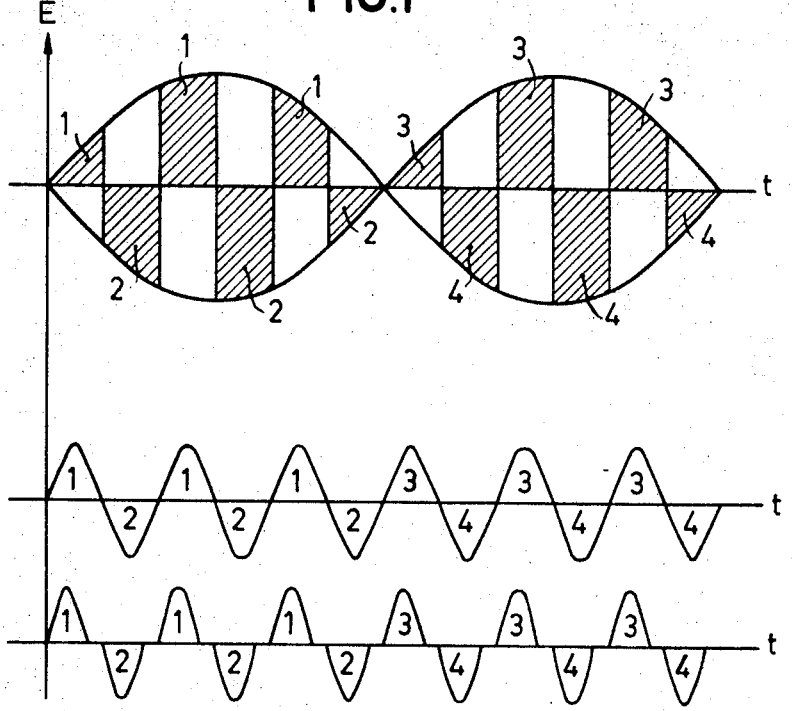
Figure 3:
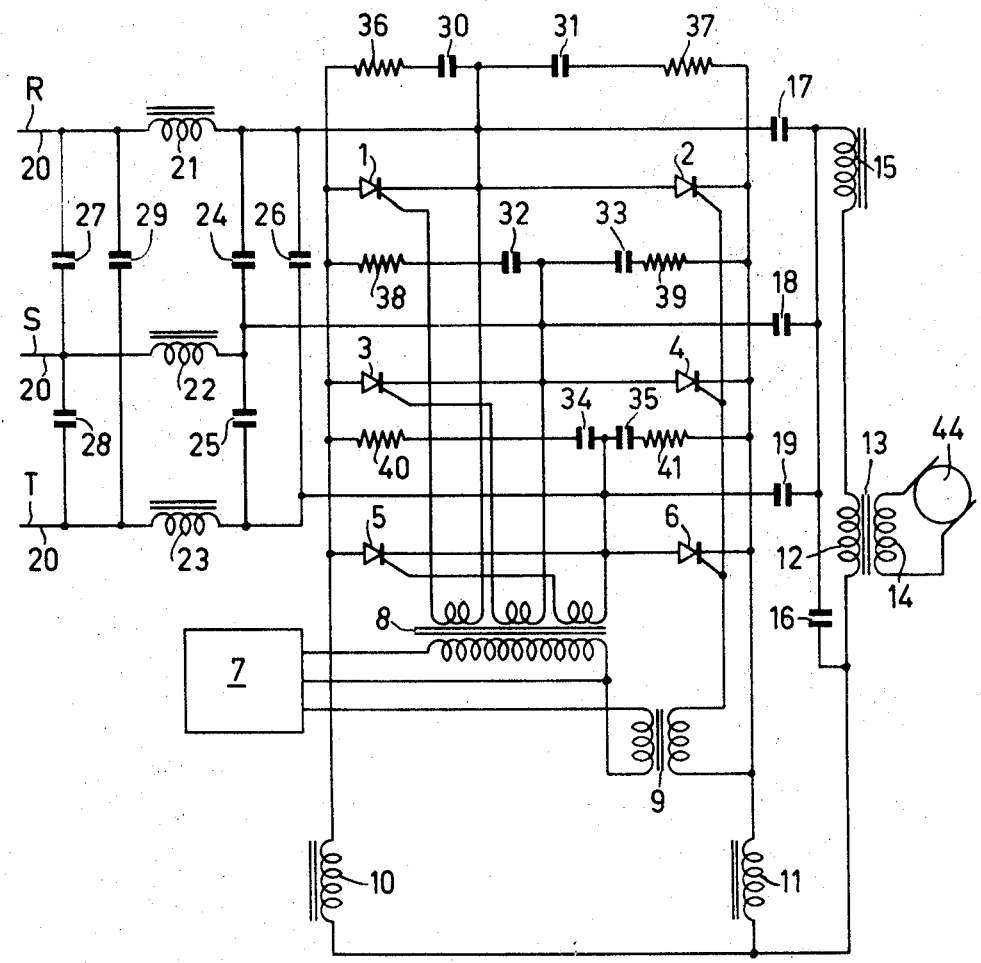
Figure 4:
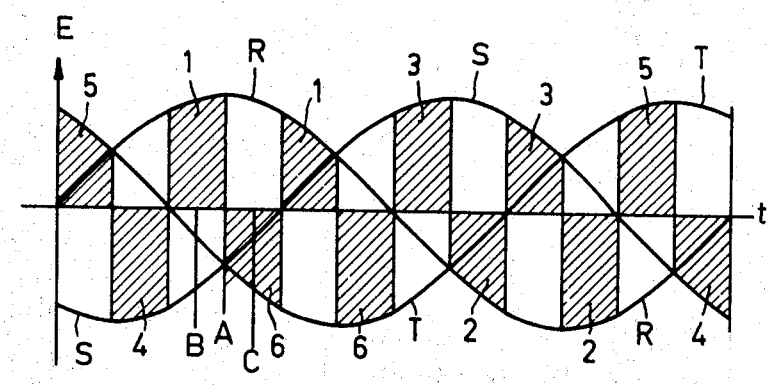
Figure 5:
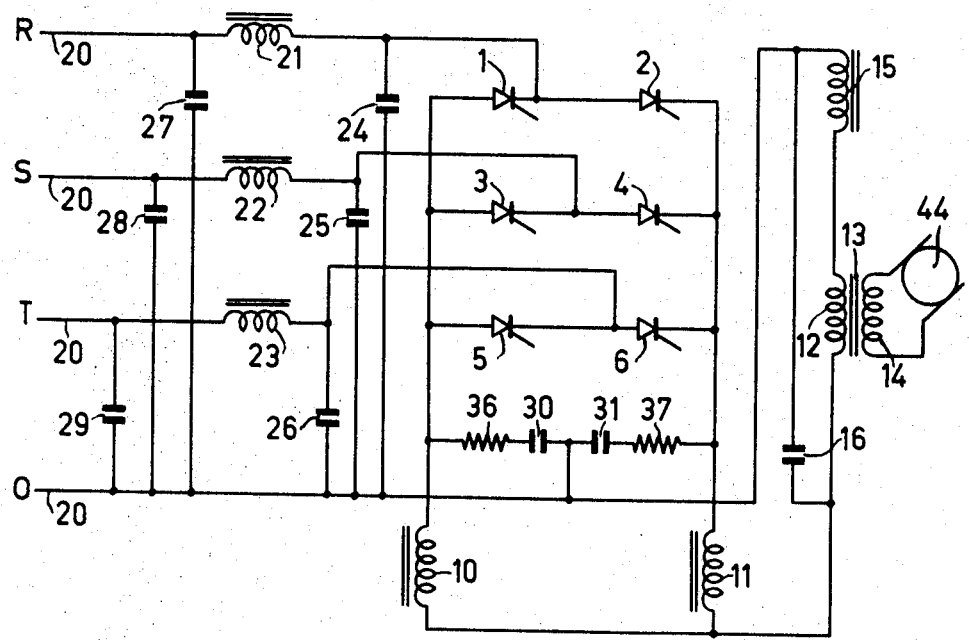

In order that the invention may be readily carried into effect it will now be described in detail, by way of example, with reference to the accompanying diagrammatic drawing, in which:

FIG. 1 is the circuit diagram of one embodiment of a frequency converter according to the invention, FIG. 2 is a voltage versus time diagram which serves to explain the operation of said embodiment, FIG. 3 is the diagram of a second embodiment, FIG. 4 is a voltage versus time diagram which serves to explain the operation of the embodiment of FIG. 3, and FIG. 5 is the diagram of a variant of the embodiment of FIG. 3.

The frequency converter of FIG. 1 comprises four controlled rectifiers in the form of semiconductor controlled rectifiers or thyristors 1, 2, 3 and 4, and a generator 7 which controls said rectifiers in accordance with a desired output frequency through transformers 8 and 9.

The controlled rectifiers 1–4 are included in a rectifier bridge having two DC circuits each consisting of two controlled rectifiers 1 and 4 and 3 and 2, respectively, connected in series and in the same pass direction. The DC voltage output points of said bridge, connected to the anodes of the rectifiers 1 and 3, and to the cathodes of the rectifiers 2 and 4, respectively, are connected to respective choke coils 10 and 11 which are not magnetically coupled. The coils in turn are connected to one end of an output circuit.

The output circuit consists of a primary winding 12 of an output transformer 13 having a secondary winding 14, an inductance 15 connected in series with the primary 12 and which may be formed by the leakage inductance of the transformer 13, and a capacitor 16 connected across the series arrangement of the primary 12 and the inductance 15.

The other end of the output circuit 12, 15, 16 is connected to the neutral point of a capacitive network consisting of two equal capacitors 17 and 18. The capacitors are connected to the common points of the controlled rectifiers 1 and 4 and 3 and 2, respectively, of the two different DC circuits of the rectifier bridge. Said common points of hte rectifiers 1 and 4 and 3 and 2, respectively, are each connected on the other hand to a corresponding terminal of an AC voltage supply source 20, through an LC filter including series inductances 21 and 22 and shunt capacitors 24 and 27, said L–C filter blocking the output frequency and passing the supply frequency.

An attenuation circuit consisting of capacitors 30 and 31, in series with resistors 36 and 37, respectively, shunts one (1) of the rectifiers 1 and 3 and one (2) of the rectifiers 2 and 4 connected to each of the two coils 10 and 11.

Said attenuation circuits safeguard the controlled rectifiers against the high reverse voltage peaks generated across the choke coils upon interruption of the current flowing through them. Each of the controlled rectifiers should be safeguarded against said voltage peaks but to this end two attenuation circuits are sufficient because of the presence of the capacitors 17, 18 and 24 of high capacitance.

The load connected to the secondary 14 of the transformer 13 of the output circuit is a rectifier bridge 42 to the DC voltage output terminals of which the cathode-anode circuit of a magnetron 43, for example, has been connected.

The AC voltage supply source 20 is, for example, an AC voltage supply of 220 volts and 50 c./s. and the output voltage applied to the rectifier bridge 42 is, for example, a voltage having a nominal frequency of 6000 c./s. The output circuit 12, 15, 16 forms a parallel resonance circuit. It is preferably tuned approximately to said preferred output frequency and forms, together with each of the two choke coils 10 and 11, a series circuit tuned to a frequency that is higher than the desired output frequency, which in turn is higher than that of the AC supply voltage.

The generator 7 oscillates at the desired output frequency and controls alternately, at the said recurrence frequency and through the transformer 8, the two rectifiers 1 and 3 connected to the choke coil 10, and, at the same recurrence frequency and through the transformer 9, the two rectifiers 2 and 4 connected to the other choke coil 11. Consequently, of the two controlled rectifiers (1 and 3 and 2 and 4, respectively) to a given transformer, only that one is rendered conductive the cathode of which is negative and the anode of which is positive. For example, as shown on the first line of FIG. 2, the rectifiers 1 and 2 are alternately rendered conductive (hatched areas) during a first half period of the supply voltage and the rectifiers 3 and 4 are alternately rendered conductive during the succeeding half period.

Whenever one of the rectifiers 1-4 is conductive, the parallel resonance circuit 12, 15, 16 is excited thereby via the corresponding choke coil 10 or 11 so as to maintain an AC current $I_u$ of the control frequency flowing through said circuit. This is shown on the second line of FIG. 2, in which the rectifier conducting at any instant is also shown.

The filter 21, 22, 24, 27 suppresses all peaks possibly occurring in the AC voltage supplied by the supply source 20 and prevents them from reaching the controlled rectifiers 1-4. Mainly, however, it prevents the generated high frequencies output voltage from reaching the supply source 20 and provides a low impedance capacitive shunt for said output voltage.

Due to the output circuit 12, 15, 16 forming, together with the choke coil 10 or with the choke coil 11 a series circuit tuned to a frequency higher than the desired output frequency, the current $I_s$ flowing through said series circuit and through the rectifier which is now conducting passes the zero value prior to the current $I_u$, as shown on the third line of FIG. 2. The relevant rectifier is thus extinguished prior to the subsequent rectifier becoming conductive. The "commutation" thus causes no difficulties as long as the difference between a half period of the AC output voltage of the frequency $f_u$ and a half period of the oscillation at the natural frequency $f_s$ of the series circuit 12, 15, 16, 10, 17, 18 or 12, 15, 16, 11, 18, 17 is higher than the recovery time of the controlled rectifiers.

The conditions $f_s > f_u$ substantially means that the inductance of each of the choke coils 10 and 11 must be smaller than the inductance active in the parallel resonance circuit 12, 15, 16. For example, in the case where the inductance 15 is formed by the stray inductance of the transformer 13 and the load 42, 43 is substantially ohmic, it must be smaller than said inductance 15.

The output circuit 12, 15, 16 preferably forms, together with each of the choke coils 10 and 11, a series circuit tuned to a frequency $f_s$ that is more than 1.4 times the output frequency. If the output circuit 12, 15, 16 is tuned to the output frequency $f_u$ said condition ($f_s > 1.4 f_u$) means that the inductance (for example, $L_{15}$) which is active in the output circuit is more than twice the inductance of each of the choke coils 10 and 11

$$(L_{15} > 2L_{10} = 2L_{11})$$

Under these circumstances the value and/or the character (inductive, ohmic or capacitive) of the load 42, 43 has very little influence on the shape of the current pulses flowing through each of the controlled rectifiers 1-4. The amplitude of said current pulses increases substantially in proportion with the load power, while the output voltage $V_u$ is determined substantially and almost exclusively by the value of the voltage across the load.

This applies particularly to the magnetron 43 which may be replaced by a source of reverse voltage $E_m$ having a negligibly small internal resistance. A corresponding reverse voltage $E_u = E_m/n$ is then active across the inductance 12, 15 alternately with one polarity and the other, wherein $n$ is the transformation ratio between the secondary 14 and the primary 13. The peak value of the AC voltage $E_{16}$ across the capacitor 16 should thus at least be equal to that of said voltage $E_u$. On the other hand, neglecting the voltage drop across the controlled rectifiers 1-4 (of the order of magnitude of 1 volt in semiconductor controlled rectifiers) the amplitude of $E_1$ is equal to half that of the AC supply voltage $E_{20}$ increased by the voltage $E_u$:

$$E_{16} \text{ peak} = \tfrac{1}{2} E_{20} \text{ peak} + E_u$$

The maximum reverse voltage across a controlled rectifier, for example rectifier 1, is equal to the peak value of the AC supply voltage $E_{20}$ increased by $$\frac{C_{16} + C_{17} + C_{18}}{C_{17} + C_{18}}$$

multiplied by the reverse voltage $E_u$:

$$V_{1\text{ max}} = E_{20} \text{ peak} + \frac{C_{16} + C_{17} + C_{18}}{C_{17} + C_{18}} E_\mu \text{ peak}$$

The power $P_u$ supplied to the reverse voltage source 43 is equal to $2 f_u \cdot E_{20} c \cdot C_{16} \cdot E_u$. Now $E_{20} = E_{20}$ peak. Sin $\omega_v$, wherein $\omega_v$ is $2\pi f_v$ and $f_v$ = frequency of the AC supply voltage.

Thus we have:

$$P_u = \frac{4}{\pi} f_u \cdot E_{20} \text{ peak} \cdot C_{16} \cdot E_u$$

In a practical embodiment for supplying a magnetron 43 of the Philips type DX 206, the controlled rectifiers 1-4 were semiconductor rectifiers of the Philips type BTY 91/800 R, while the rectifier bridge 42 was built up of diodes of the Philips type BY 138 with ten diodes in series in each branch. Each of the choke coils 10 and 11 had an inductance of 75 $\mu$H, the transformer 13 and the inductance 15 were wound on a common ferrite core with an air gap consisting of two U-shaped half cores. The primary 12 of thirty turns was wound on one limb over the secondary 14 of a thousand turns, while the inductance 15 of 150 $\mu$H consisting of 25 turns was wound on the other limb. The air-gap limited the inductance of the primary circuit 12, 15 to 1000 $\mu$H under no-load conditions, a value at which the converter could still be switched on without danger to the controlled rectifiers, while the ratio $n$ was equal to 1000/55 = 18.2.

The filter inductances 21 and 22 were wound on a common ferrite core and each had a value of approximately 330 $\mu$H, the other elements having the following values:

Capacitor 16—4 $\mu$F
Capacitors 17 and 18—10 $\mu$F
Capacitor 24—10 $\mu$F

Capacitor 27—10 μF
Capacitors 30 and 31—0.1 μF
Resistors 36 and 37—33Ω

With these elements, the resonance frequency $f_s$ of the series circuit 12, 15, 16, 10, 17, 18 or 12, 15, 16, 11, 17, 18 was equal to 10.3 kc./s., so that the output frequency $f_u$ preferably had to remain lower than $$0.7 \cdot 10.3 = 7.2 \text{ kc./s.}$$

The parallel resonance frequency of the capacitor 16 and the inductance 15 was equal to 6.50 kc./s., so that said condition could be fulfilled with a control frequency equal to said resonance frequency.

A power of 2½ kw. at a voltage of 5.6 kv. was supplied to the magnetron 43 with an AC supply voltage of 220 volts and at a control frequency of 6600 c./s. To maintain said desired values upon variations in the AC supply voltage, the control frequency had to be changed approximately inversely proportional to said supply voltage and at $E_{20}=220+10\%$ had to be decreased to 6000 c./s. and at $E_{20}=220-10\%$ had to be increased to 7300 c./s. which can readily be brought about by an automatic frequency control of the control generator 7.

The efficiency of the converter was of the order of magnitude of 90% and its weight was only 8 kg. or 30% of that of the conventional high voltage supply apparatus including a supply frequency transformer.

The embodiment of FIG. 3 is supplied by a three-phase AC supply 20. Accordingly the frequency converter comprises a rectifier bridge having three DC circuits each consisting of two controlled rectifiers 1 and 2, 3 and 4 and 5 and 6, respectively, connected in series and in the same pass direction while the control transformer 8 is provided with three secondaries for controlling the rectifiers 1, 3 and 5. One end of the output circuit 12, 15, 16 is connected to the neutral point of a capacitive network connected to the common points of the controlled rectifiers of the various DC circuits of the rectifier bridge 1–6, which network consists of three equal capacitors 17, 18 and 19.

The common point of the two controlled rectifiers (for example, 1 and 2) of each DC circuit is connected to the corresponding terminal (for example, R) of the AC voltage supply source through a low pass filter composed of elements 21, 24, 27 or 22, 25, 28 or 23, 26, 29 and, for maintaining the symmetry, each controlled rectifier 1–6 is shunted by an attenuation circuit 30, 36; 31, 37; 32, 38; 33, 39; 34, 40, or 35, 41.

The operation of the embodiment of FIG. 3 fully corresponds to that of the first embodiment.

The forward control pulses alternately supplied by the control transformer 8 and by the control transformer 9 always renders conductive that controlled rectifier 1, 3 and 5 and 2, 4 and 6, respectively, of which the anode-cathode voltage lies in the forward direction and has the highest instantaneous value, as indicated by the hatched segments in FIG. 4. It may occur as, for example, at point A (90°) that a control pulse is generated at an instant when equal forward voltages are set up across two controlled rectifiers (4 and 6). In such case both rectifiers become conductive almost simultaneously but the one (4), the anode-cathode voltage of which decreases is extinguished by the other (6), the anode-cathode voltage of which increases.

If a control pulse is generated prior to such an instant, for example, at point B, (75°) then the rectifier 4 becomes conducting. If then the succeeding control pulse comes after the instant corresponding to point A, for example, at the instant corresponding to point C (105°) then the rectifier 4 remains conducting till this last instant if the first control pulse has already ended at the instant corresponding to point A. Otherwise, the rectifier 6 is rendered conducting at the instant corresponding to point A, takes over the current and extinguishes the rectifier 4, to be in turn extinguished at the instant corresponding to point C.

In this case the load is indicated as being formed by the armature circuit 44 of a commutator motor.

FIG. 5 shows a variant of the embodiment of FIG. 3.

In this variant the AC voltage supply source 20 has an accessible zero-conductor and the neutral point of the AC voltage supply source, to which the one end of the output circuit is connected, is directly connected to said zero-conductor. Under these circumstances, two attenuation circuits 30, 36 and 31, 37, respectively, are sufficient, while maintaining the symmetry. Each controlled rectifier is thus shunted by an attenuation circuit 30, 36 or 31, 37 in series with one of the filter capacitors 24, 25 and 26.

It stands to reason that frequency converters of the type described, including a rectifier bridge, can be constructed with more than two or three DC circuits, for example, with six DC circuits each consisting of two controlled rectifiers connected in series and in the same pass direction. However, the advantage relative to the known combination of a rectifier and a succeeding converter becomes smaller with an increasing number of phases and is very doubtful if one has to start from a conventional three-phase AC supply source to realize a supply source having a higher number of phases, for example, six.

What is claimed is:

1. A frequency converter comprising a source of AC supply voltage, a rectifier bridge including at least two DC circuits each comprising two controlled rectifiers connected in series in the same pass direction with a common junction point therebetween, means connecting the DC voltage output terminals of said bridge through respective choke coils to one end of an output circuit, means connecting the other end of the output circuit to a neutral point of the AC voltage supply source, means connecting the common point of the two controlled rectifiers of each DC circuit to a corresponding terminal of the AC voltage supply source, means coupled to the control electrodes of said controlled rectifiers for controlling the current therein in accordance with a desired output frequency that is higher than the frequency of said AC supply voltage, said output circuit together with each of the two choke coils forming a series circuit tuned to a frequency that is higher than the desired output frequency, said current controlling means being arranged to alternately control all of the controlled rectifiers connected to one of the choke coils and all of the controlled rectifiers connected to the other choke coil.

2. A converter as claimed in claim 1, wherein said neutral poitn is connected to a zero-conductor of the AC voltage supply source.

3. A converter as claimed in claim 1 wherein said neutral point is the neutral point of a capacitive network connected to the common points of the controlled rectifiers of the various DC circuits of the rectifier bridge.

4. A converter as claimed in claim 1 wherein said series circuit is tuned to a frequency that is more than 1.4 times the output frequency.

5. A converter as claimed in claim 4 wherein the output circuit comprises a parallel resonant circuit tuned approximately to a preferred output frequency.

6. A converter as claimed in claim 1 further comprising an LC filter arranged to block the output frequency and pass the supply frequency, and means connecting the common point of the two controlled rectifiers of each DC circuit to the corresponding terminal of the AC voltage supply source through said LC filter.

7. A converter as claimed in claim 1 wherein at least one of the controlled rectifiers connected to each of the two choke coils is shunted by an attenuation circuit.

8. A frequency converter comprising, a source of AC voltage, a bridge circuit having input terminals connected to said voltage source and first and second output terminals, said bridge circuit including first and second controlled rectifiers serially connected with like polarity between said output terminals and having a common junction poitn connected to one input terminal and third and fourth cotrolled rectifiers serially connected with like polarity between said output terminals and having a common junction point connected to the other input terminal, first and second coils, an output circuit, means connecting said first and second coils between said first and second output terminals, respectively, and one end of the output circuit to form first and second series resonant circuits tuned to a frequency that is higher than the desired output frequency, means connecting the other end of the output circuit to a neutral point of the AC voltage source, and means coupled to the control electrodes of said bridge rectifiers for alternately triggering same in pairs in accordance with said output frequency.

9. A converter as claimed in claim 8 wherein said triggering means is arranged to trigger said first and third rectifiers simultaneously and to alternately trigger said second and fourth rectifiers simultaneously, all at said output frequency, said converter further comprising a capacitor network coupled to said voltage source to form said neutral point.

10. A converter as claimed in claim 8 wherein said output circuit comprises a parallel resonant circuit tuned approximately to the output frequency and said series circuits are tuned to a frequency that is at least 1.4 times the output frequency, said output frequency being higher than the frequency of said AC voltage source.

References Cited

UNITED STATES PATENTS

| | | | |
|---|---|---|---|
| 3,213,347 | 10/1965 | Macklem | 321—4 |
| 3,302,093 | 1/1967 | Yarrow | 321—69 XR |
| 3,360,710 | 12/1967 | Barthold. | |
| 3,406,326 | 10/1968 | Stemmler | 321—69 XR |
| 3,431,483 | 3/1969 | Lafuze | 321—7 |
| 3,435,321 | 3/1969 | Brandt | 321—69 XR |

WILLIAM M. SHOOP, Jr., Primary Examiner

U.S. Cl. X.R.

321—60, 69